United States Patent
Sakai (10) Patent No.: US 8,009,342 B2
(45) Date of Patent: Aug. 30, 2011

(54) OPTICAL SCANNING DEVICE, IMAGE FORMING APPARATUS, AND CONTROLLING METHOD

(75) Inventor: Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/901,768

(22) Filed: Oct. 11, 2010

(65) Prior Publication Data

US 2011/0090549 A1 Apr. 21, 2011

(30) Foreign Application Priority Data

Oct. 21, 2009 (JP) ................................ 2009-242674

(51) Int. Cl.
*G02B 26/08* (2006.01)

(52) U.S. Cl. ..................................... 359/198.1; 347/243

(58) Field of Classification Search ............... 359/197.1, 359/198.1, 204.1, 216.1; 347/225, 233, 241–244
See application file for complete search history.

(56) References Cited

U.S. PATENT DOCUMENTS

| | | | |
|---|---|---|---|
| 5,831,758 A | 11/1998 | Sakai et al. | |
| 5,999,345 A | 12/1999 | Nakajima et al. | |
| 6,166,842 A | 12/2000 | Aoki et al. | |
| 6,256,133 B1 | 7/2001 | Suzuki et al. | |
| 6,347,004 B1 | 2/2002 | Suzuki et al. | |
| 6,366,384 B1 | 4/2002 | Aoki et al. | |
| 6,388,792 B1 | 5/2002 | Atsuumi et al. | |
| 6,448,998 B1 | 9/2002 | Suzuki et al. | |
| 6,509,995 B1 | 1/2003 | Suzuki et al. | |
| 6,596,985 B2 | 7/2003 | Sakai et al. | |
| 6,771,407 B2 | 8/2004 | Hayashi et al. | |
| 6,781,729 B2 | 8/2004 | Suzuki et al. | |
| 6,856,438 B2 | 2/2005 | Takanashi et al. | |
| 6,999,208 B2 | 2/2006 | Suzuki et al. | |
| 7,006,120 B2 | 2/2006 | Sakai et al. | |
| 7,034,973 B2 | 4/2006 | Sakai | |
| 7,038,822 B2 | 5/2006 | Sakai et al. | |
| 7,215,354 B1 | 5/2007 | Sakai et al. | |
| 7,218,432 B2* | 5/2007 | Ichii et al. ................. | 359/204.4 |
| 7,253,937 B2 | 8/2007 | Ueda et al. | |
| 7,330,296 B2 | 2/2008 | Sakai | |
| 7,362,486 B2 | 4/2008 | Hayashi | |
| 7,411,712 B2 | 8/2008 | Nakajima et al. | |

(Continued)

FOREIGN PATENT DOCUMENTS

JP 2006-332142 12/2006

(Continued)

*Primary Examiner* — Euncha P Cherry
(74) *Attorney, Agent, or Firm* — Cooper & Dunham LLP (57) ABSTRACT

An optical scanning device includes a vertical cavity surface emitting laser, a driving unit that controls modulation driving, a coupling optical system that couples a beam, an aperture that is configured to define a beam spot diameter, a deflecting unit that deflects a laser beam incoming, and a scanning optical system that guides the laser beam, wherein the driving unit controls so as to satisfy conditions 1 and 2 below: condition 1: $P1>P100$, condition 2: $Wm<Ws$, where $P1$ is an amount of light at a time after a period $T1$ corresponding to a minimum pixel unit has elapsed since beginning of light emission, $P100$ is an amount of light at a time after a time period of $100 \times T1$ has elapsed since the beginning of light emission, $Wm$ is a static beam spot diameter in a main-scanning direction, and $Ws$ is a static beam spot diameter in a sub-scanning direction.

5 Claims, 6 Drawing Sheets

U.S. PATENT DOCUMENTS

| | | |
|---|---|---|
| 7,417,777 B2 | 8/2008 | Saisho et al. |
| 7,443,558 B2 | 10/2008 | Sakai et al. |
| 7,616,364 B2 | 11/2009 | Saisho et al. |
| 7,663,657 B2 | 2/2010 | Ichii et al. |
| 7,672,032 B2 | 3/2010 | Hayashi et al. |
| 7,688,491 B2 | 3/2010 | Saisho et al. |
| 7,701,480 B2 | 4/2010 | Omori et al. |
| 2007/0211326 A1 | 9/2007 | Saisho et al. |
| 2007/0253048 A1 | 11/2007 | Sakai et al. |
| 2009/0059333 A1 | 3/2009 | Sakai |
| 2010/0194843 A1 | 8/2010 | Sakai et al. |

FOREIGN PATENT DOCUMENTS

| | | |
|---|---|---|
| JP | 2008-213246 | 9/2008 |

* cited by examiner

OPTICAL SCANNING DEVICE, IMAGE FORMING APPARATUS, AND CONTROLLING METHOD

CROSS-REFERENCE TO RELATED APPLICATIONS

The present application claims priority to and incorporates by reference the entire contents of Japanese Patent Application No. 2009-242674 filed in Japan on Oct. 21, 2009.

BACKGROUND OF THE INVENTION

1. Field of the Invention

The present invention relates to an optical scanning device, and more particularly to an optical scanning device that is suitable for an image forming apparatus such as a digital copier or a laser printer.

2. Description of the Related Art

Image formation using an optical scanning technology is widely implemented in image forming apparatuses such as digital copiers and laser printers.

Examples of known optical scanning technologies for enabling high-speed image formation include a multiple-beam scanning technology. As a laser light source suitable for such a scanning technology, a vertical cavity surface emitting laser (VCSEL) has been increasingly used.

Another type of laser light source used in a multiple-beam scanning technology includes an edge emitting semiconductor laser array. An edge emitting semiconductor laser (hereinafter, the "edge emitting laser (EEL)") may be used in plurality to employ a compound prism to combine beams. However, these technologies enable only several light-emitting elements to be arranged at the same time.

In contrast, the VCSEL enables tens to hundreds of laser light-emitting elements to be arrayed on the same plane from which laser beams are output, and each of the laser beams can be modulated individually. Accordingly, this technology enables tens to hundreds of scanning lines to be drawn simultaneously. Therefore, the VCSEL can fully achieve high-speed image formation, which is an advantage of the multiple-beam scanning.

However, one of the problems unique to a VCSEL is that the amount of light changes dynamically at the time the elements are driven (dynamic characteristics). Such dynamic characteristics include, for example, droop characteristic, rise time characteristic, and fall time characteristic (for example, see Japanese Patent Application Laid-open No. 2006-332142 and Japanese Patent Application Laid-open No. 2008-213246).

Known causes of these kinds of phenomena, observed in a general semiconductor laser, include a change in a threshold current caused by the light source element itself being heated by a current applied thereto, and a capacitor-resistor (CR) time constant of an electric circuit. Because of these phenomena, image density varies, resulting in poor image quality such as uneven density or uneven color tone. Therefore, a technology such as automatic power control (APC) has been used to reduce such variations.

An EEL and a VCSEL used conventionally exhibit different characteristics, such as wavelength characteristics or driving characteristics due to their structural differences.

In particular, an EEL and a VCSEL have significantly different driving characteristics. In an EEL, because mode hopping (wavelength hopping) occurs in an extremely short time period at the time the EEL is driven, heat can change the length of the optical path in the resonator. In addition, the gain function of a laser medium changes due to a sudden characteristic change that occurs immediately after the application of the current. When these changes occur, a light beam can jump into a mode that is most advantageous to oscillating (a mode with a large gain).

Figure 1:
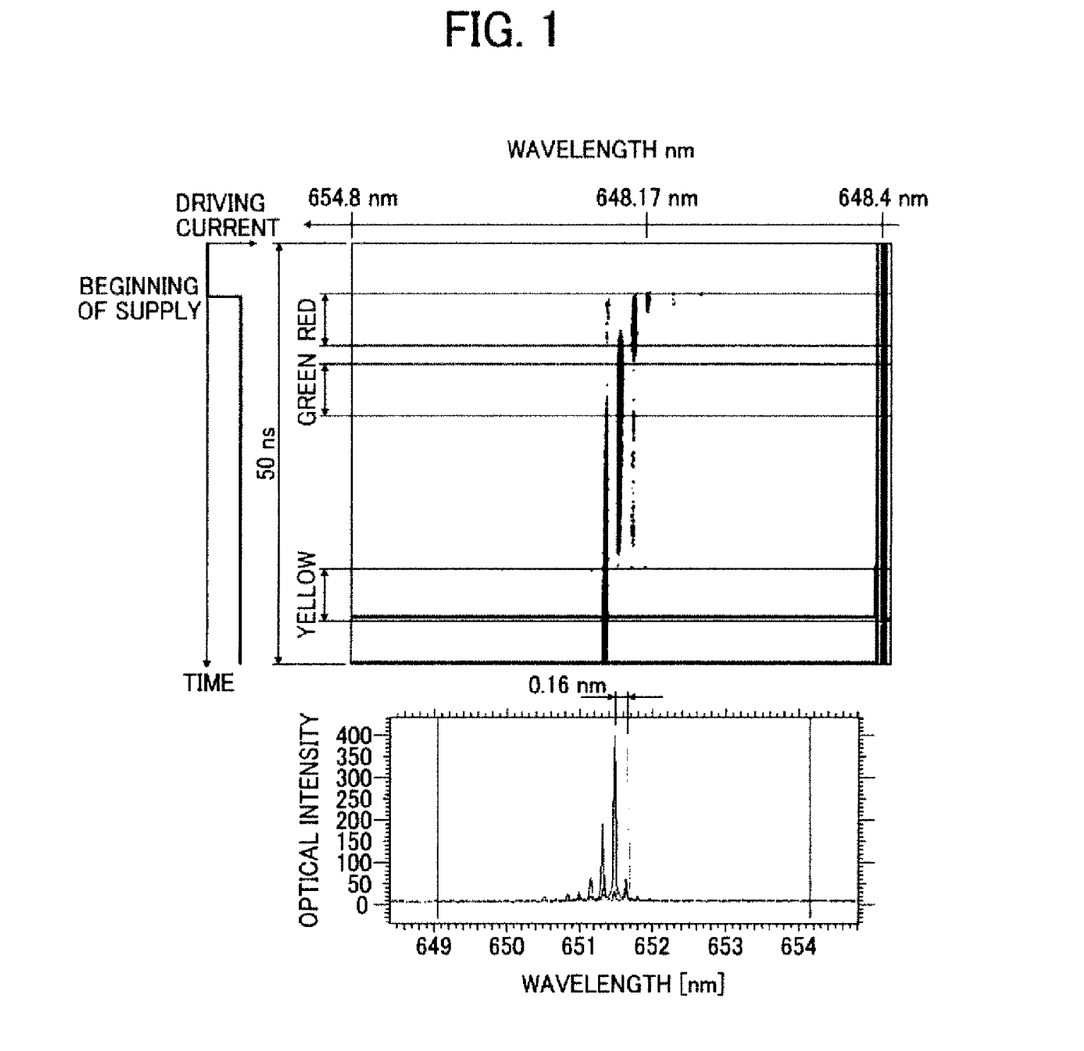
FIG. 1 is a schematic illustrating an example of an observation of mode hopping.

FIG. 1 is a schematic of an example of an observation of the mode hopping. The horizontal axis in FIG. 1 indicates the wavelength, and the vertical axis indicates elapsed time. FIG. 1 illustrates the optical response of each wavelength within a frame of approximately 50 nanoseconds, observed immediately after the application of the driving current.

Immediately after the driving current is applied, a short wavelength mode (648.17 nanometers) rises. Longer wavelength modes gradually come to dominate (mode hopping), and these modes eventually stabilize into a single mode.

In FIG. 1, the spacing between neighboring modes is 0.16 nanometer. The spacing of approximately 0.2 nanometer between neighboring modes is extremely smaller than that in a generally used EEL having a wavelength of 650 nanometers, making no problem in terms of image forming characteristics. In other words, the total optical output across the entire modes is relatively stable with respect to any change in internal conditions of the elements.

On the contrary, because a VCSEL has substantially only one wavelength, no mode hopping theoretically occurs in principle. In other words, the wavelengths of the neighboring modes are extremely remote to each other, e.g., the wavelength of a neighboring mode is half or twice the oscillating wavelength. For example, a mode, neighboring a VCSEL having a wavelength of 780 nanometers, has a wavelength of 390 nanometers or 1,560 nanometers. Because the wavelength difference is extremely large, such a mode is not caused to oscillate, being unable to attain the gain of the laser medium.

Therefore, because a VCSEL keeps oscillating in the same mode under any conditions, VCSELs are less flexible compared with EELs, and unable to achieve a stable optical output.

In addition, in a semiconductor laser, when a current is applied to suddenly change the temperature of the active layer, such a temperature change leads to a change in the refractive index. A change in the refractive index further induces a change in the optical confinement. Accordingly, a divergence angle (far field pattern (FFP)) of a laser beam instantaneously changes; the FFP is small near a current application time t to a current application time 0, and increases over time. In an optical system having an aperture, such a change is generally translated into a change in the amount of light (rise time characteristic) caused at the time the element is driven with a constant current.

In a scanning optical system, such a variation affects the amount of light on a target surface in a larger degree irrespective of whether the type of the system is an under-field type or an over-field type.

Figure 2A:
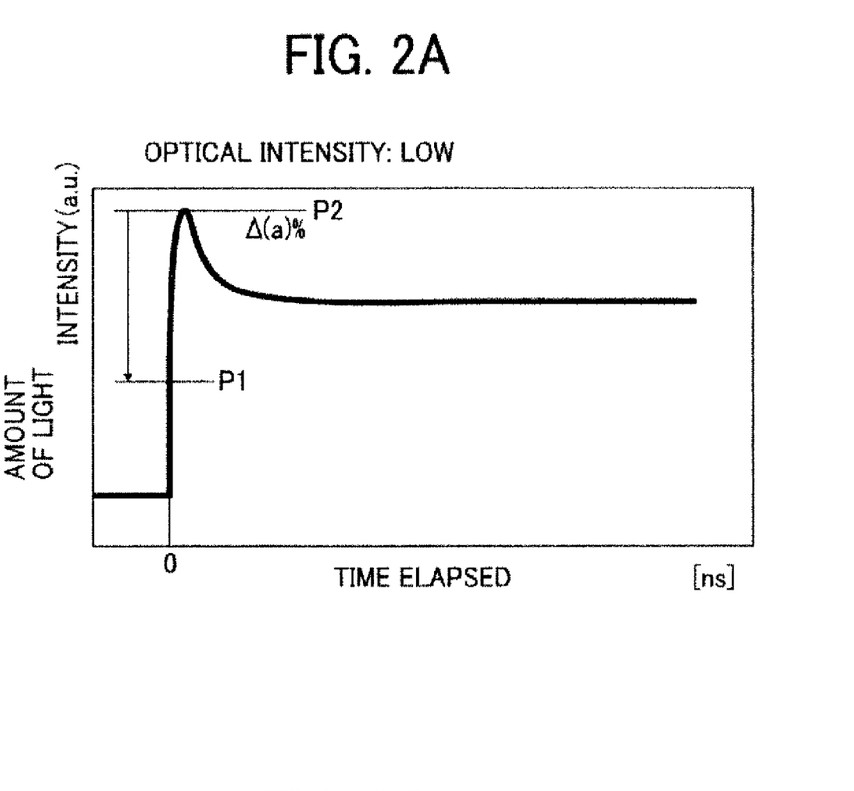
FIGS. 2A and 2B are graphs illustrating an example of dynamic characteristics of the unstable amount of light.
Figure 2B:
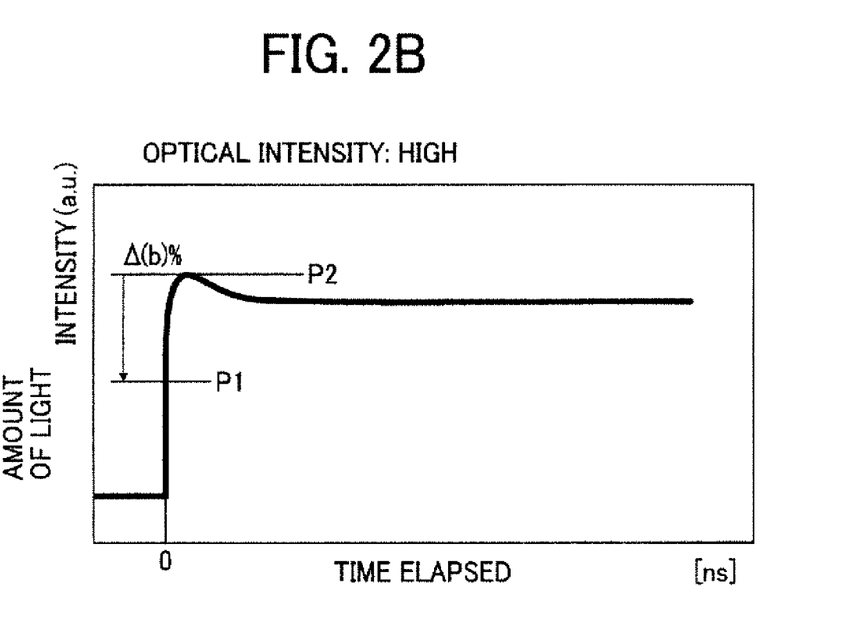

FIGS. 2A and 2B are graphs representing the dynamic characteristics of the unstable amount of light caused by combinations of the factors described above. The horizontal axis indicates the elapsed time since the time zero which is the time the current is applied, and the vertical axis indicates the observed amount of light. Such dynamic characteristics of the amount of light in the VCSEL are observed when a large current is applied. Examples of a situation in which a large current is applied include:

(1) when a part of a light beam is fed back to stabilize the optical output of the VCSEL, the amount of light in the beam travelling to the photosensitive element becomes less than a half; and (2) when the photosensitive element is less sensitive, a larger current needs be applied.

In the region where a large current is applied, FIG. 2A indicates an example with a low optical intensity, and FIG. 2B indicates an example with a high optical intensity. The difference Δ between the amount of light (P2) at the time when the optical intensity temporarily surges and the amount of light (P1) near the current application time zero is Δ(a) percent and Δ(b) percent, indicated in FIGS. 2A and 2B, respectively. Δ is calculated using Equation 3 below:

$$\Delta = |(P1-P2)|/P2 \qquad (3)$$

If the difference between Δ(a) and Δ(b) is large, the amount of light varies depending on an optical scanning device, whereby a poor image is formed.

The problem of the dynamic characteristics of the amount of light illustrated in FIGS. 2A and 2B described above has conventionally been addressed by means of an electrical driving control technology, for example. However, to address the problem unique to the VCSEL, the above technology alone is inadequate.

SUMMARY OF THE INVENTION

It is an object of the present invention to at least partially solve the problems in the conventional technology.

According to an aspect of the present invention, there is provided an optical scanning device including: a vertical cavity surface emitting laser; a driving unit that controls modulation driving for the vertical cavity surface emitting laser; a coupling optical system that couples a beam output from the vertical cavity surface emitting laser; an aperture that is configured to define a beam spot diameter on a target surface; a deflecting unit that deflects a laser beam incoming from the aperture; and a scanning optical system that guides the laser beam incoming from the deflecting unit to the target surface, wherein the driving unit controls so as to satisfy conditions 1 and 2 below:

$$P1 > P100 \qquad \text{condition 1}$$

$$Wm < Ws \qquad \text{condition 2}$$

where P1 is an amount of light at a time after a period T1 corresponding to a minimum pixel unit has elapsed since beginning of light emission, P100 is an amount of light at a time after a time period of 100×T1 has elapsed since the beginning of light emission, Wm is a static beam spot diameter in a main-scanning direction, and Ws is a static beam spot diameter in a sub-scanning direction.

According to another aspect of the present invention, there is provided an image forming apparatus including the optical scanning device mentioned above.

According to still another aspect of the present invention, there is provided a controlling method employing an optical scanning device that includes: a vertical cavity surface emitting laser; a driving unit that controls modulation driving for the vertical cavity surface emitting laser; a coupling optical system that couples a beam emitted from the vertical cavity surface emitting laser; an aperture that is configured to define a beam spot diameter on a target surface; a deflecting unit that deflects a laser beam incoming from the aperture; and a scanning optical system that guides the laser beam incoming from the deflecting unit to the target surface, the controlling method including; controlling so as to satisfy conditions 1 and 2 below by the driving unit:

$$P1 > P100 \qquad \text{condition 1}$$

$$Wm < Ws \qquad \text{condition 2}$$

where P1 is an amount of light at a time after a period T1 corresponding to a minimum pixel unit has elapsed since beginning of light emission, P100 is an amount of light at a time after a time period of 100×T1 has elapsed since the beginning of light emission, Wm is a static beam spot diameter in a main-scanning direction, and Ws is a static beam spot diameter in a sub-scanning direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary Configuration of Image Forming Apparatus 500

An exemplary configuration of an image forming apparatus 500 according to an embodiment of the present invention will be explained with reference to FIG. 3.

The image forming apparatus 500 according to the embodiment includes a photosensitive element 511, a charging roller 512, a developing unit 513, a transfer roller 514, a cleaning unit 515, a fixing unit 516, an optical scanning device 900, a cassette 518, a pair of registration rollers 519, a feeding roller 520, a pair of discharging rollers 522, and a tray 523.

Figure 3:
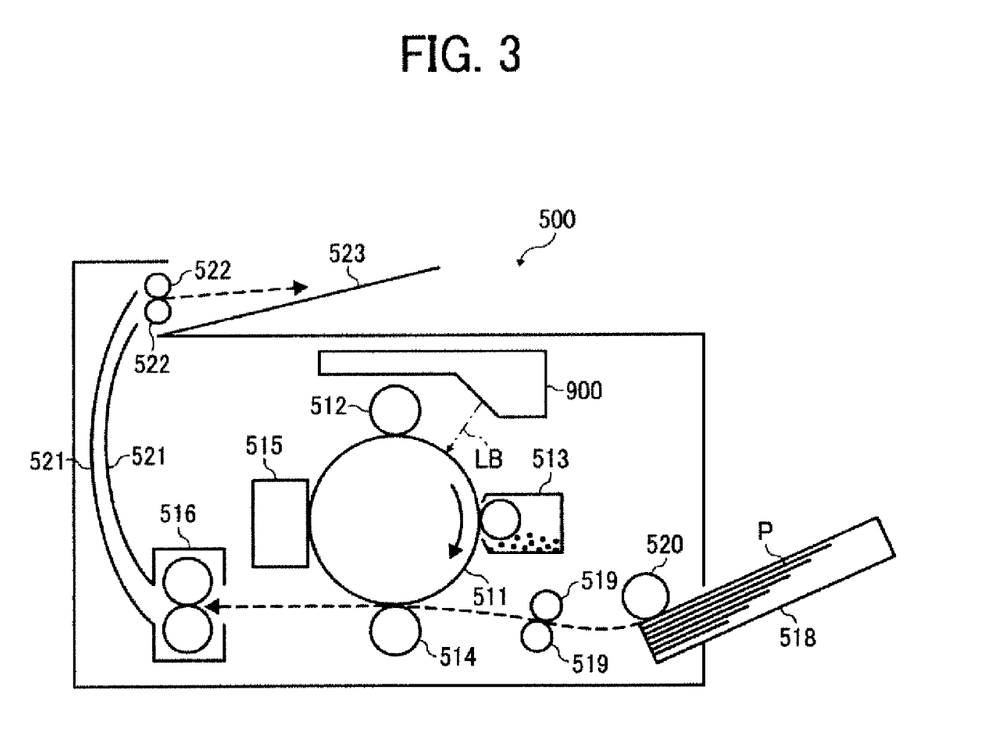
FIG. 3 is a schematic of an exemplary configuration of an image forming apparatus 500 according to an embodiment of the present invention.

The charging roller 512, the developing unit 513, the transfer roller 514, and the cleaning unit 515 are arranged near the surface of the photosensitive element 511, in the order they are listed in this sentence, along the direction in which the photosensitive element 511 is rotated (the direction indicated by the arrow in FIG. 3).

The photosensitive element 511 serves as an image carrier, and a photoconductive photosensitive layer is formed on the surface of the photosensitive element 511.

The charging roller 512 serves as a charging unit that uniformly charges the surface of the photosensitive element 511.

The optical scanning device 900 scans the surface of the photosensitive element 511 charged by the charging roller 512 with a light beam LB modulated, based on image information received from a higher-level apparatus (for example, a personal computer). By means of the optical scanning device 900 performing optical scanning, only the portion of the surface of the photosensitive element 511 that is irradiated with the light beam is discharged, and a latent image (electrostatic latent image) corresponding to the image information is formed on the surface of the photosensitive element 511. The latent image formed in this manner is a so-called negative latent image, and is carried toward the developing unit 513 as the photosensitive element 511 is rotated. A direction along the longitudinal direction of the photosensitive element 511 (a direction in parallel to the rotation axis) is referred to as the "main-scanning direction", and a direction in which the photosensitive element 511 is rotated is referred to as the "sub-scanning direction". A specific configuration of the optical scanning device 900 will be described later.

The developing unit 513 includes a toner cartridge containing toner, and causes the toner onto adhere only to the portion irradiated with the light beam on the photosensitive element 511. In other words, the developing unit 513 causes the toner to adhere onto the latent image formed on the surface of the photosensitive element 511, to visualize the image information. The latent image (toner image) onto which the toner is adhered is carried toward the transfer roller 514 as the photosensitive element 511 is rotated.

The cassette 518 is attached to the main body of the image forming apparatus 500 in a detachable manner, and stores therein sheets of transfer paper P serving as media on which an image is to be transferred. The feeding roller 520 is arranged near the cassette 518 and picks up the top sheet of the transfer paper P stored in the cassette 518.

The pair of registration rollers 519 is arranged near the transfer roller 514, and catches the leading edge of the transfer paper fed by the feeding roller 520. The pair of registration rollers 519 conveys the transfer paper toward a nip between the transfer roller 514 and the photosensitive element 511 at the timing when the toner image on the photosensitive element 511 is carried to a transfer position. The conveyed transfer paper is superimposed onto the toner image by the transfer roller 514, and the toner image is electrostatically transferred to the transfer paper.

The transfer paper on which the toner image is transferred is conveyed to the fixing unit 516. After the toner image is fixed in the fixing unit 516, the transfer paper is carried through a conveying path 521, and is then discharged onto the tray 523 by the pair of discharging rollers 522.

The cleaning unit 515 cleans the surface of the photosensitive element 511 after the toner image is transferred, to remove remaining toner, paper dust, and the like therefrom.

Exemplary Configuration of Optical Scanning Device 900

Figure 4:
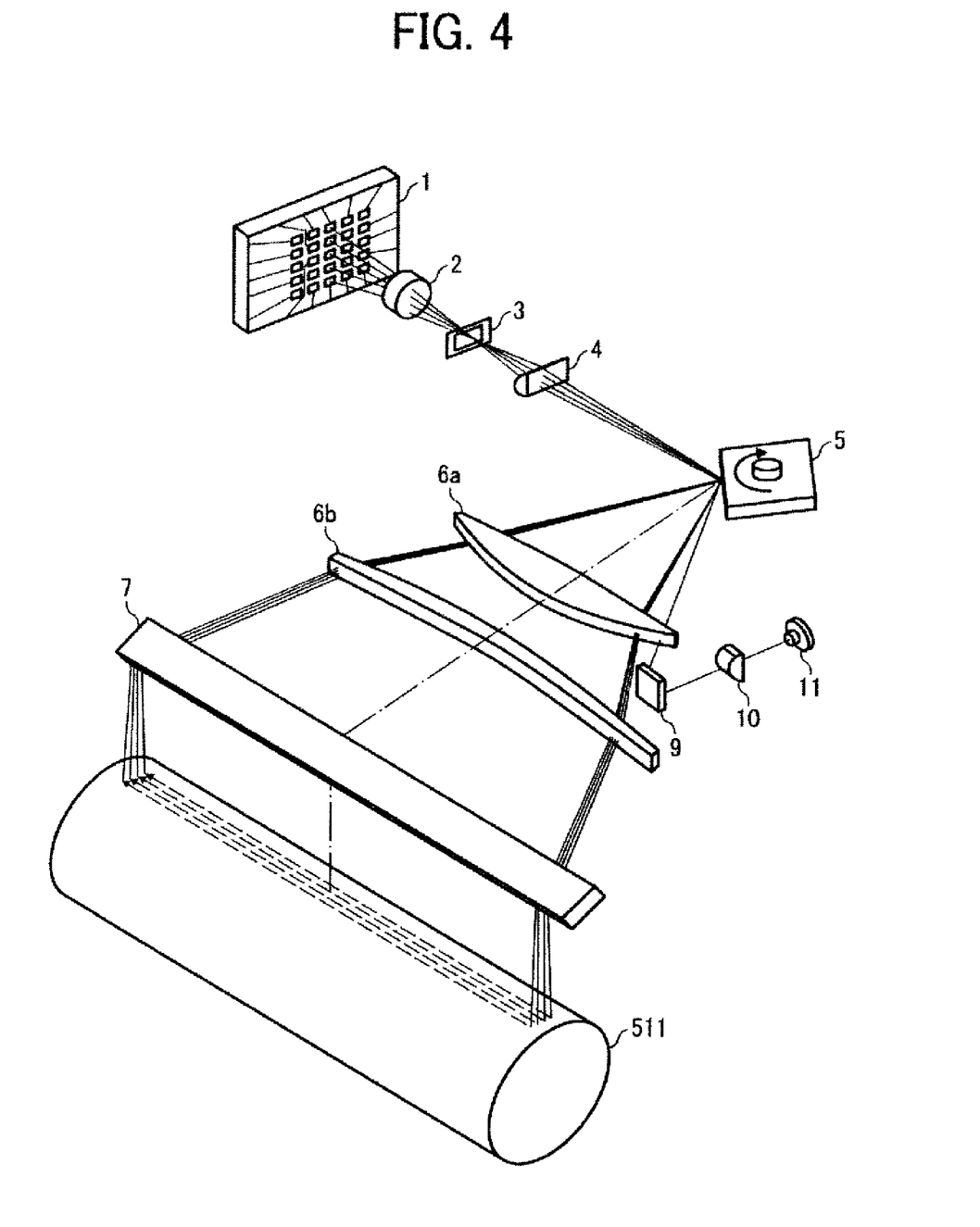
FIG. 4 is a schematic of an exemplary configuration of an optical scanning device 900 according to the embodiment.

An exemplary configuration of the optical scanning device 900 according to the embodiment will be described with reference to FIG. 4.

The optical scanning device 900 according to the embodiment includes a vertical cavity surface emitting laser (VCSEL) 1, a coupling optical system 2, an aperture 3, a linear image forming lens 4, a polygon mirror 5 serving as a deflecting unit, two scanning lenses 6a, 6b, a folding mirror 7, a synchronizing mirror 9, a synchronizing lens 2a0, and a synchronizing detecting unit 11.

The VCSEL 1 includes a plurality of light-emitting elements designed to have an emission wavelength of 780 nanometers.

The coupling optical system 2 substantially collimates the beam emitted from the VCSEL 1.

The aperture 3 has a rectangular opening for shaping the beam that has passed through the coupling optical system 2, to define the beam spot diameter on the photosensitive element 511.

The linear image forming lens 4 forms an image of the beam that has passed through the opening of the aperture 3 with respect to the sub-scanning direction at a position near a deflecting reflection surface of the polygon mirror 5.

The polygon mirror 5 is rotated at a constant speed about an axis parallel to the sub-scanning direction, to deflect the beam that has passed through the linear image forming lens 4. The polygon mirror 5 is surrounded by soundproof glass (not illustrated).

The two scanning lenses 6a and 6b guide the beam deflected on the polygon mirror 5 to the folding mirror 7.

The folding mirror 7 folds the optical path of the beams that have passed through the scanning lens 6b toward the surface of the photosensitive element 511.

The optical components arranged in the optical path between the polygon mirror 5 and the photosensitive element 511 is referred to as a scanning optical system. In this embodiment, the scanning optical system includes the scanning lens 6a, the scanning lens 6b, and the folding mirror 7. Dustproof glass (not illustrated) is arranged between the folding mirror 7 and the photosensitive element 511.

Part of the beams penetrated through the scanning lens 6a and travelling outside of the effective scanning area is received at the synchronizing detecting unit (synchronizing sensor) 11 via the synchronizing mirror 9 and the synchronizing lens 2a0. The synchronizing detecting unit 11 outputs a signal (photoelectric conversion signal) corresponding to the received amount of light. The timing at which the scanning is started is determined based on the output of the synchronizing detecting unit 11.

Figure 5:
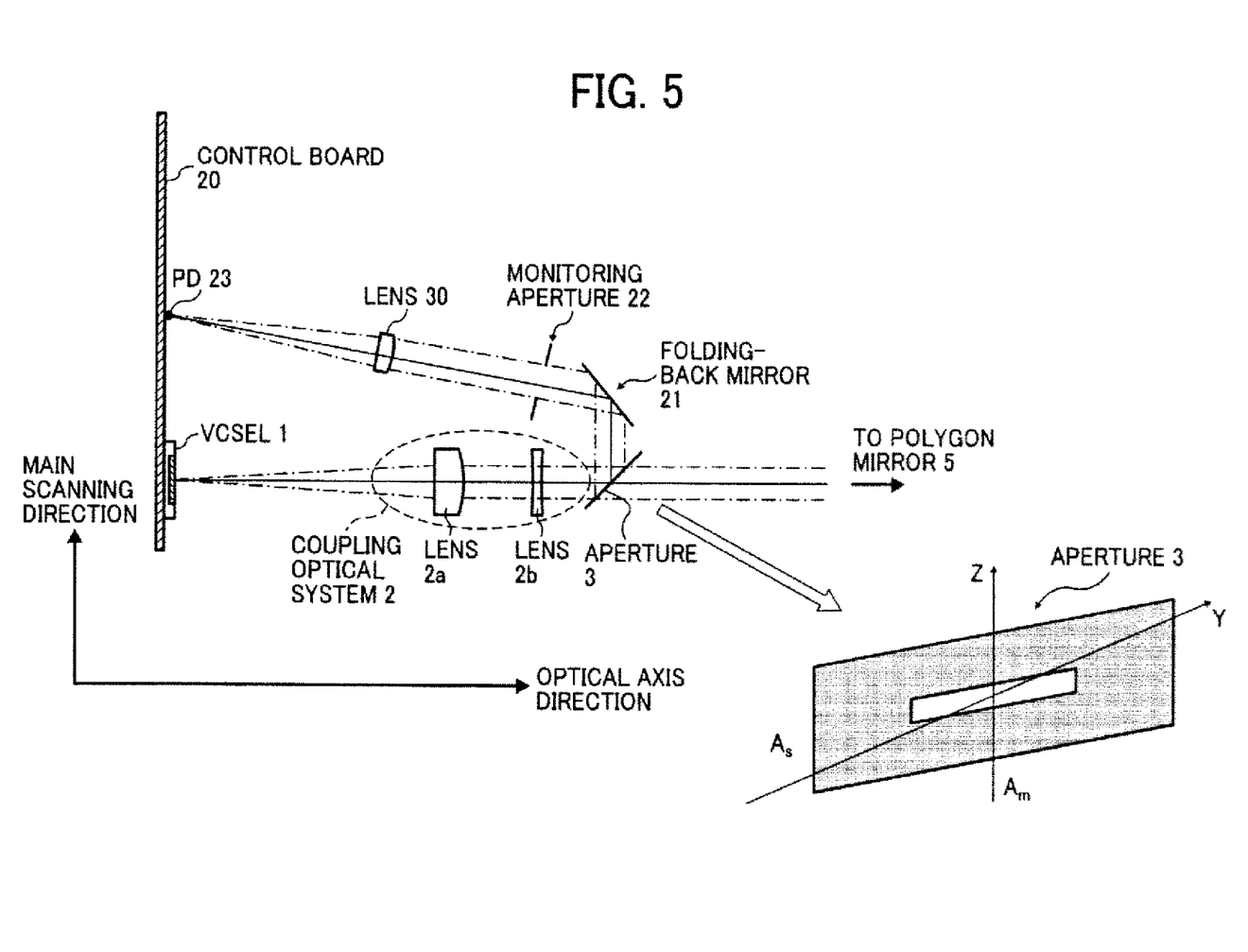
FIG. 5 is a schematic of an exemplary configuration of the optical scanning device 900 according to the embodiment.

A specific configuration between the VCSEL 1 and the polygon mirror 5 will be described with reference to FIG. 5.

A control board 20 includes the VCSEL 1, and controls modulation driving for the VCSEL 1. The control board 20 causes the VCSEL 1 to output forty laser beams. The interval between the scanning lines that are farthest apart on a target surface in the sub-scanning direction is up to 0.4 millimeter.

Figure 6:
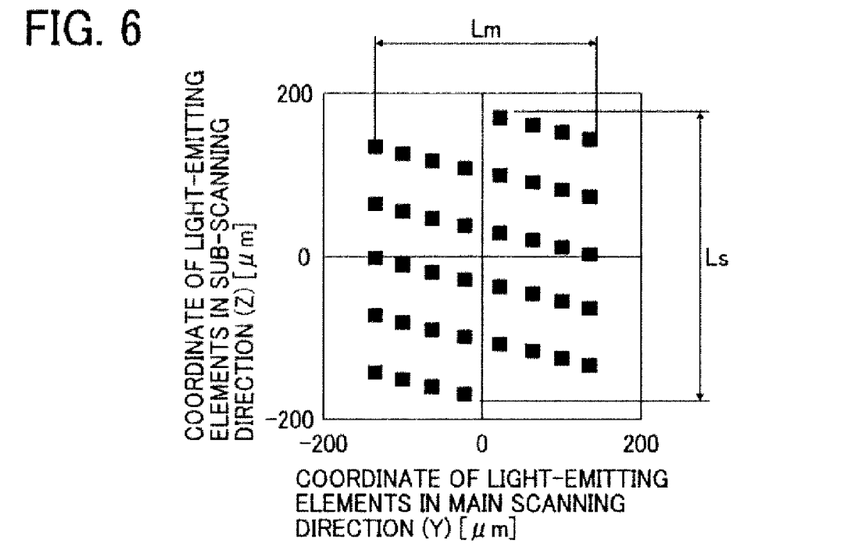
FIG. 6 is a schematic of an exemplary configuration of a vertical cavity surface emitting laser (VCSEL) 1.

As illustrated in FIG. 6, the VCSEL 1 is made as a monolithic laser diode (LD) array in which a plurality of light-emitting elements is arranged in an array. In FIG. 6, $L_m$ represents the maximum distance between the light-emitting elements arranged in the main-scanning direction, and $L_s$ represents the maximum distance between the light-emitting elements arranged in the sub-scanning direction. The divergence angle (FFP) of the laser beams under a normal condition (a stable condition when the light-emitting elements emit light) is 7 degrees, both in the main-scanning direction and the sub-scanning direction, in a circular shape.

The coupling optical system 2 includes a glass lens (lens 2a) and a resin lens (lens 2b), and converts the beams output from the VCSEL 1 to substantially collimated beams. The coupling optical system 2 functions to reduce a change in the position of the beam waist and the variation in the beam spot diameter when temperature changes.

The aperture 3 shapes the collimated beam to stabilize the beam spot diameter. In the optical system, $A_m$ is set to 6.7 millimeters, and $A_s$ is set to 1.1 millimeters. For a static beam spot diameter, $W_m$ is set to 50 micrometers, and $W_s$ is set to 60 micrometers. $A_m$ herein represents the length of the aperture 3 in the main-scanning direction, and $A_s$ represents the length of the aperture 3 in the sub-scanning direction. $W_m$ represents the static beam spot diameter in the main-scanning direction, and $W_s$ represents the static beam spot diameter in the sub-scanning direction. The static beam spot diameter mentioned herein means the spot diameter of the beam spot on the target surface while the optical scanning device 900 is not being scanned (with the polygon mirror 5 being stationary).

In the optical scanning device 900, the optical elements arranged between the VCSEL 1 and the aperture 3 are formed integrally on a light source unit. This configuration allows both of the glass lens (lens 2a) and the resin lens (lens 2b) to be adjusted so as to reduce the effects of errors in assembling and processing of each of the optical elements, so that the adjustment can be made for the entire light source unit. The combined focal length of the glass lens (lens 2a) and the resin lens (lens 2b) is 45 millimeters.

The beam reflected on the aperture 3 is guided to a folding-back mirror 21, passes through a monitoring aperture 22 and a lens 30, and is then collected on a photo diode (PD) 23 arranged on the control board 20. By monitoring the power of the light collected on the PD 23, the control board 20 can satisfactorily correct an increase or a decrease in the amount of light travelling to the polygon mirror 5, caused by, for example, the deterioration of the VCSEL 1.

Figure 7:
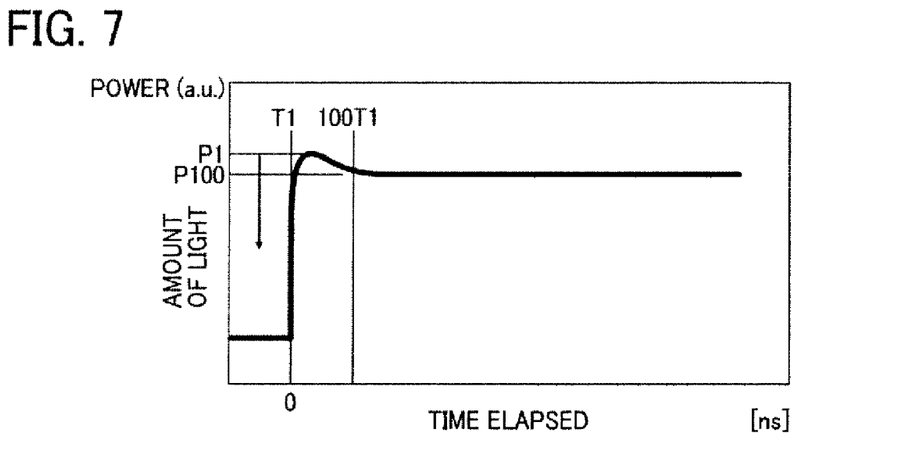
FIG. 7 is a schematic for explaining an example in which the VCSEL 1 is set to P1>P100.

Upon causing the VCSEL 1 according to the embodiment to output light in the region where a power is high with a high current injection, the power needs to be set to P1>P100 as illustrated in FIG. 7. In FIG. 7, the horizontal axis indicates elapsed time where the current application time is zero, and the vertical axis indicates the observed amount of light. P1 represents the amount of light at the time after a period T1 corresponding to a minimum pixel unit has elapsed since the beginning of light emission, and P100 represents the amount of light at the time after a period of 100×T1 has elapsed since the beginning of light emission.

If the static beam spot diameter on the target surface is set to $W_m=W_s$ while driving the VCSEL 1 at P1>P100 to draw a linear image for a grid on a target surface, for example, the horizontal line corresponding to the sub-scanning direction would be thinner than the vertical line corresponding to the main direction. To solve this problem in the simplest manner, the thicknesses between the horizontal line and the vertical line can be balanced by setting the static beam spot diameters to $W_m<W_s$. This is the reason why the $W_m$ is set to 50 micrometers and $W_s$ is set to 60 micrometers as mentioned above.

In contrast to the static beam spot diameter, a dynamic beam spot diameter is defined as a spot size $1/e^2$ of the maximum intensity when the scanning is performed for the scanning time T1. In other words, the dynamic beam spot diameter can be considered to be the same as the size of an isolated one dot. T1 is defined as the time required for obtaining a value of 25.4/1200=21.2 micrometers, for example, when writing in 1200 dpi resolution.

The dynamic beam spot diameter according to the embodiment is Dm=Ds=60 micrometers. Dm represents the dynamic beam spot diameter in the main-scanning direction, and Ds represents the dynamic beam spot diameter in the sub-scanning direction. Dm represents the beam spot diameter in the main-scanning direction when the VCSEL 1 emits light for a time period T1 corresponding to a minimum pixel unit after the beginning of light emission, and Ds represents the beam spot diameter in the sub-scanning direction after light emission for T1.

Figure 8:
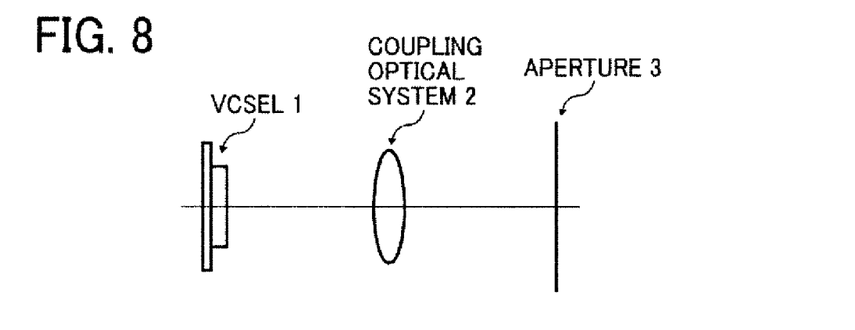
FIG. 8 is a schematic of a relation of positions of the VCSEL 1, a coupling optical system 2, and an aperture 3.

FIG. 8 is a schematic of a relation of the positions of the VCSEL 1, the coupling optical system 2, and the aperture 3. As illustrated in FIG. 8, the aperture 3 is arranged near the rear focal point of the coupling optical system 2. This configuration can make the vignetting in the forty laser beams, caused by the aperture 3, uniform; therefore, the difference in effects of P1>P100 can be reduced.

Some layouts may not allow the aperture 3 to be arranged near the rear focal point of the coupling optical system 2. In such a case, the aperture 3 is arranged between the rear focal point of the coupling optical system 2 and the coupling optical system 2 to satisfy $L_m>L_s$ and $A_m>A_s$. $L_m$ represents the maximum distance between the light-emitting elements arranged in the main-scanning direction, $L_s$ represents the maximum distance between the light-emitting elements arranged in the sub-scanning direction, $A_m$ represents the length of the aperture 3 in the main-scanning direction, and $A_s$ represents the length of the aperture 3 in the sub-scanning direction. This configuration allows an optical energy of the forty laser beams to be efficiently transmitted to the optical system arranged downstream of the aperture 3. Furthermore, the dynamic characteristics caused by making P1>P100 can be made uniform in each of the light-emitting elements; therefore, the image stability can be improved.

Effects and Advantages of Optical Scanning Device 900 According to the Embodiment As described above, the optical scanning device 900 according to the embodiment includes the VCSEL 1, the control board 20 that controls modulation driving for the VCSEL 1, the coupling optical system 2 that couples a beam output from the VCSEL 1, the aperture 3 that is configured to define a beam spot diameter on a target surface, the polygon mirror 5 that deflects a laser beam incoming from the aperture 3, and the scanning optical system (the scanning lens 6a, the scanning lens 6b, and the folding mirror 7) that guides the laser beam incoming from the polygon mirror 5 to the target surface. The control board 20 controls so as to satisfy conditions 1 and 2 below:

$$P1>P100 \qquad \text{condition 1}$$

$$W_m<W_s \qquad \text{condition 2}$$

where P1 is an amount of light at a time after a period T1 corresponding to a minimum pixel unit has elapsed since the beginning of light emission; P100 is an amount of light at a time after a time period of 100×T1 has elapsed since the beginning of light emission; $W_m$ is a static beam spot diameter in a main-scanning direction; and $W_s$ is a static beam spot diameter in a sub-scanning direction.

In this manner, the optical scanning device 900 using the VCSEL 1 according to the embodiment can obtain a stable image.

Example

A specific example of the optical scanning device 900 according to the embodiment illustrated in FIG. 4 will be explained.

To begin with, an optical system arranged upstream of the polygon mirror 5 (the aperture 3 and the linear image forming lens 4) will be explained.

The beam incident to the aperture 3 is collimated. The size of the aperture is set to $A_m$=6.7 millimeters and $A_s$=1.1 millimeters. $A_m$ represents the length of the aperture 3 in the main-scanning direction, and $A_s$ represents the length of the aperture 3 in the sub-scanning direction. The linear image forming lens 4 (cylindrical lens) has a focal length of 57 millimeters and focuses a focal point on a reflecting surface of the polygon mirror 5.

The optical system arranged downstream of the polygon mirror 5 (the polygon mirror 5 and the scanning lenses 6a and 6b) will be explained.

The polygon mirror 5 and a scanning optical system 6 (scanning lenses 6a and 6b) are configured in a manner specified in Table 1.

TABLE 1

|  | $R_m$ | $R_s$ | X | Y | n |
|---|---|---|---|---|---|
| Polygon mirror (rotation axis) | — | — | 68.63 | 12.43 | — |
| SCANNING LENS 6a | −125.93 | −500 | 14 | 0 | RESIN 1 |
|  | −60.678 | −550 | 89.34 | 0 | — |
| SCANNING LENS 6b | −10000 | 268.018 | 3.5 | 0 | RESIN 1 |
|  | −44.257 | −44.257 | 143.92 | 0 | — |
| TARGET SURFACE | — | — | — | — | — |

In Table 1, $R_m$ represents the paraxial curvature in the main-scanning direction, $R_s$ represents the paraxial curvature in the sub-scanning direction, and X and Y represent a relative distance from the point of origin of an optical element to the point of origin of the next optical element. The unit used in Table 1 is millimeters.

For example, X and Y for the polygon mirror 5 indicate that, when seen from the rotation axis of the polygon mirror 5, the point of origin on the light-incoming surface of the scanning lens 6a (the position of the optical axis on the light-incoming surface) is 68.63 millimeters away from the rotation axis of the polygon mirror 5 in the optical axis direction, and 12.43 millimeters away from the rotation axis of the polygon mirror 5 in the main-scanning direction. The thickness of the scanning lens 6a along the optical axis is 14 millimeters, the distance between the surface of the scanning lens 6a and the surface of the scanning lens 6b is 89.34 millimeters, the thickness of the scanning lens 6b is 3.5 millimeters along the optical axis, and the distance from the scanning lens 6b to the target surface is 143.92 millimeters.

Each of the scanning lenses 6a and 6b in the scanning optical system 6 has an aspheric surface. "The shape thereof in the main-scanning direction is equal to a non-arc shape X", and X is obtained by Equation 1 below. Each of the scanning lenses 6a and 6b has a special surface where a curvature $C_s(Y)$ on a sectional plane in the sub-scanning direction (imaginary sectional plane parallel to the optical axis and the sub-scanning direction) changes in the main-scanning direction according to Equation 2 below:

Non-Arc Shape $$X = \frac{Y^2/R_m}{1+\sqrt{1-(1+K_m)\cdot(Y/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \ldots \quad (1)$$

Where, $R_m$ is the paraxial curvature radius on a sectional plane in the main scanning direction; Y is the distance away from the optical axis in the main-scanning direction; $K_m$ is a conic constant; and $A_1, A_2, A_3, A_4, A_5, A_6, \ldots$ are higher-order coefficients.

Curvature $C_s(Y)$ across sectional plane in sub-scanning direction $$C_s(Y)=1/R_s(0)+B_1\cdot Y+B_2\cdot Y^2+B_3\cdot Y^3+B_4\cdot Y^4+B_5\cdot Y^5+B_6\cdot Y^6+\ldots \quad (2)$$

Where, Y is the coordinate in the main-scanning direction when the point of origin is defined at the position of the optical axis; $R_s(0)$ is the radius of curvature on a sectional plane in the sub-scanning direction including the optical axis; and $B_1, B_2, B_3, B_4, B_5, B_6, \ldots$ are coefficients.

The coefficients of the surfaces used in Equations 1 and 2 are indicated in Table 2 below:

TABLE 2

|  | L1 | | L2 | |
|---|---|---|---|---|
|  | Sur. 1 | Sur. 2 | Sur. 1 | Sur. 2 |
| $R_{m0}$ | −125.930 | −60.678 | −10000 | 520.144 |
| a00 | 0.00000E+00 | 0.00000E+00 | 0.00000E+00 | 0.00000E+00 |
| a04 | 6.91397E−07 | 7.94205E−07 | 3.29667E−07 | 1.27206E−07 |
| a06 | −1.17421E−10 | 8.10435E−11 | −7.12268E−11 | −4.62723E−11 |
| a08 | −7.59529E−14 | −4.46442E−14 | 6.28263E−15 | 4.04792E−15 |
| a10 | 4.98921E−17 | 6.78493E−18 | −2.72118E−19 | −1.65776E−19 |
| a12 | −7.99430E−21 | 4.18587E−21 | 4.69377E−24 | 2.58917E−24 |
| $R_{s0}$ | −500 | −550 | 268.018 | −44.257 |
| b01 |  | 948903E−06 | 1.92169E−06 |  |
| b02 |  | −4.04246E−06 | −9.73515E−07 | 3.26958E−07 |
| b03 |  | 7.83108E−09 | 2.78624E−10 |  |
| b04 |  | −2.32948E−09 | 7.99963E−11 |  |
| b05 |  | −1.27532E−11 | −8.27927E−14 |  |
| b06 |  | 1.22637E−12 | 1.16623E−14 |  |
| b07 |  | 2.55440E−15 | 8.54769E−18 |  |
| b08 |  | 4.46134E−16 | −1.73644E−18 |  |
| b09 |  | 6.68092E−19 | −3.04.34E−22 |  |
| b10 |  | −1.67752E−19 | 6.41013E−23 |  |

The embodiment is an exemplary embodiment of the present invention, and not intended to limit the scope of the present invention thereto. The present invention can be implemented with various modifications as long as such modifications do not depart from the spirit of the present invention.

For example, each of the units included in the optical scanning device 900 according to the embodiment can be controlled by means of hardware or software, or any combination thereof.

When such a process is performed using software, a computer program recording therein a process sequence may be installed to a memory of a computer that is incorporated into dedicated hardware, and causing the computer to execute the sequence. Alternatively, such a computer program may also be installed in a general purpose computer capable of executing various processes, and causing the computer to execute such sequence.

For example, such a computer program may be stored, in advance, in a hard disk or a read-only memory (ROM) that serves as a recording medium. Alternatively, the computer program may be temporarily or permanently stored (recorded) in a removable recording medium. Such a removable recording medium may be provided as so-called packaged software. Examples of the removable recording medium include a floppy (registered trademark) disk, compact disk read-only memory (CD-ROM), a magneto optical (MO) disk, a digital versatile disk (DVD), a magnetic disk, a semiconductor memory and so on.

The computer program is then installed from the removable recording medium onto the computer. Alternatively, the computer program may be transmitted wirelessly to the computer from a download site, or is transmitted over the wire to the computer via a network.

According to the present invention, a stable image can be obtained in an optical scanning device using a VCSEL.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a vertical cavity surface emitting laser;
   a driving unit that controls modulation driving for the vertical cavity surface emitting laser;
   a coupling optical system that couples a beam output from the vertical cavity surface emitting laser;
   an aperture that is configured to define a beam spot diameter on a target surface;
   a deflecting unit that deflects a laser beam incoming from the aperture; and
   a scanning optical system that guides the laser beam incoming from the deflecting unit to the target surface, wherein
   the driving unit controls so as to satisfy conditions 1 and 2 below:

$$P1 > P100 \quad \text{condition 1}$$

$$W_m < W_s \quad \text{condition 2}$$

where P1 is an amount of light at a time after a period T1 corresponding to a minimum pixel unit has elapsed since beginning of light emission,
   P100 is an amount of light at a time after a time period of 100×T1 has elapsed since the beginning of light emission,
   $W_m$ is a static beam spot diameter in a main-scanning direction, and
   $W_s$ is a static beam spot diameter in a sub-scanning direction.

2. The optical scanning device according to claim 1, wherein
   the vertical cavity surface emitting laser has a plurality of light-emitting elements, and
   the aperture is arranged near a rear focal point of the coupling optical system.

3. The optical scanning device according to claim 1, wherein
   the vertical cavity surface emitting laser has a plurality of light-emitting elements, and conditions 3 and 4 below are satisfied when the aperture is arranged between a rear focal point of the coupling optical system and the coupling optical system:

$$L_m > L_s \quad \text{condition 3}$$

$$A_m > A_s \quad \text{condition 4}$$

where $L_m$ is a maximum distance between the light-emitting elements arranged in the main-scanning direction,
   $L_s$ is a maximum distance between the light-emitting elements arranged in the sub-scanning direction,
   $A_m$ is a length of the aperture in the main-scanning direction, and
   $A_s$ is a length of the aperture in the sub-scanning direction.

4. An image forming apparatus comprising an optical scanning device that includes:
   a vertical cavity surface emitting laser;
   a driving unit that controls modulation driving for the vertical cavity surface emitting laser;
   a coupling optical system that couples a beam output from the vertical cavity surface emitting laser;
   an aperture that is configured to define a beam spot diameter on a target surface;
   a deflecting unit that deflects a laser beam incoming from the aperture; and
   a scanning optical system that guides the laser beam incoming from the deflecting unit to the target surface, wherein
   the driving unit controls so as to satisfy conditions 1 and 2 below:

$$P1 > P100 \quad \text{condition 1}$$

$$W_m < W_s \quad \text{condition 2}$$

where P1 is an amount of light at a time after a period T1 corresponding to a minimum pixel unit has elapsed since beginning of light emission,
   P100 is an amount of light at a time after a time period of 100×T1 has elapsed since the beginning of light emission,
   $W_m$ is a static beam spot diameter in a main-scanning direction, and
   $W_s$ is a static beam spot diameter in a sub-scanning direction.

5. A controlling method employing an optical scanning device that includes:
   a vertical cavity surface emitting laser;
   a driving unit that controls modulation driving for the vertical cavity surface emitting laser;
   a coupling optical system that couples a beam emitted from the vertical cavity surface emitting laser;
   an aperture that is configured to define a beam spot diameter on a target surface;
   a deflecting unit that deflects a laser beam incoming from the aperture; and
   a scanning optical system that guides the laser beam incoming from the deflecting unit to the target surface,
   the controlling method comprising;
   controlling so as to satisfy conditions 1 and 2 below by the driving unit:

$$P1 > P100 \quad \text{condition 1}$$

$$W_m < W_s \quad \text{condition 2}$$

where P1 is an amount of light at a time after a period T1 corresponding to a minimum pixel unit has elapsed since beginning of light emission, P100 is an amount of light at a time after a time period of 100×T1 has elapsed since the beginning of light emission, $W_m$ is a static beam spot diameter in a main-scanning direction, and $W_m$ is a static beam spot diameter in a sub-scanning direction.

* * * * *